Jan. 19, 1971     W. H. BENDALL     3,555,918

DETACHABLE CHAIN

Filed Dec. 2, 1969

INVENTOR.

Wilfrid H Bendall

United States Patent Office 3,555,918
Patented Jan. 19, 1971

3,555,918
DETACHABLE CHAIN
Wilfrid H. Bendall, 19 N. Broad St.,
Pawcatuck, Conn. 02891
Filed Dec. 2, 1969, Ser. No. 881,557
Int. Cl. F16g 13/02
U.S. Cl. 74—249
9 Claims

ABSTRACT OF THE DISCLOSURE

A detachable chain for transmitting power between toothed sprockets. The chain has apertured links which assemble with overlapping end portions, each having projecting edge portions in rolling bearing contact with like portions of adjacent links. The links are detachably interconnected by spring clip members which engage the teeth of drive sprockets.

BACKGROUND OF THE INVENTION

Field of the invention

Figure 1:
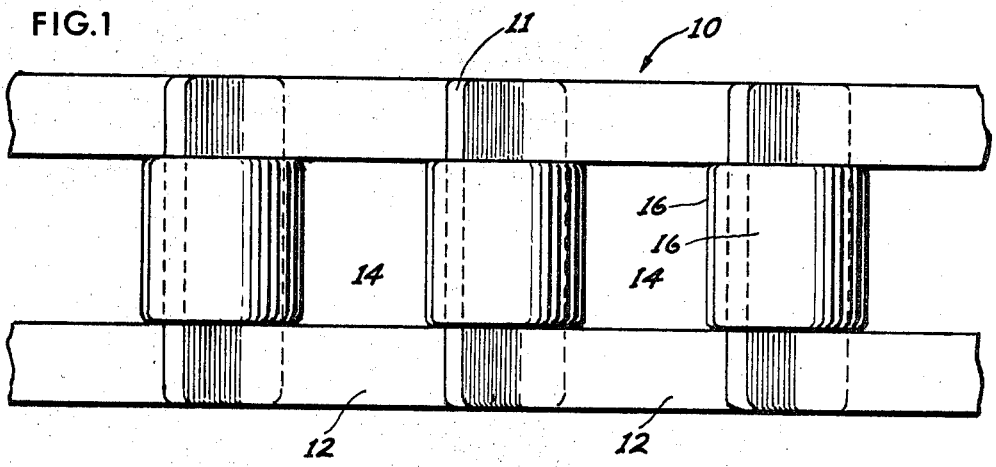

This invention relates generally to detachable link chains and in particular to new and useful improvements in such chains, simplifying construction and adapting them for substantially higher speed and power transmission than accomplished in the prior art.

Description of the prior art

Detachable chains, invented over eighty years ago and still in use today, probably embody in principle the drive chain of ultimate structural simplicity and lowest cost. Their typical design and operating characteristics however have restricted them to low speed, light load conveyor and farm implement service, using cast tooth sprockets. Drive requirements for higher power and speed have had to rely on the more expensive roller and silent chains.

Despite the economic need no detachable chain construction which could bridge the cost and performance gap between these extremes appears to have been produced. Examples of the prior art such as disclosed in U.S. Pats. 2,836,984 and 3,027,774 issued to the present inventor were of interest to industry but did not offer sufficient performance improvement to justify production and presented difficult tooling problems in fabrication.

SUMMARY OF THE INVENTION

The detachable chain of the present invention separates the functions of load transmission and sprocket tooth engagement by utilizing two different parts for the purpose. These parts, respectively, are a substantially flat apertured link member adapted for rolling bearing contact link interconnection, and semicircular spring clip members which engage drive sprocket teeth and retain the link assembly in detachable form.

This division of the essential drive chain structural and operating requirements improves upon detachable chains of the prior art by facilitating production of lower cost, high strength, precisely formed chain elements, without detracting from the desired simplicity of construction and ease of detachability. A further important advantage resides in the provision of relatively flexible retention members which engage sprocket teeth with a high degree of resilience. This feature, in addition to ensuring excellent chain load distribution on the drive sprockets and absorbing drive shocks and noise, also reduces the rate of wear. The resilient spring members, by conforming to the sprocket tooth surfaces, distribute wearing effects and engagement impact over a larger contact area than is possible with the relatively rigid link elements of the prior art.

Such provision of two parts individually better adapted to the basic requirements of a drive chain results, as in the chain of the present invention, in a detachable chain of higher specific strength (tensile strength divided by weight per foot) than heretofore achieved and makes such chain practicable for a much wider range of drive uses. For example, the industrially standardized single width roller chain of one inch link pitch has a rated average ultimate tensile strength of 14,000 pounds and a weight of 1.70 pounds per foot, resulting in a specific strength of 8,200. In comparison, the equivalent pitch chain of the present invention, fabricated in material of equal mechanical properties and dimensioned to operate on the same drive sprockets, has an ultimate strength of 10,000 pounds and a weight of 0.75 pound per foot, resulting in a specific strength of 13,000—an approximately sixty percent higher index of merit.

Efficient use of the higher static strength of the standard roller chain is possible only at low speeds, as shown by catalog ratings which indicate a rapid decline in power transmission at the comparatively low chain linear speed of two thousand feet per minute. In comparison, again, the higher specific strength of the chain of the present invention enables it to transmit more than double the power of the equivalent pitch roller chain at drive speeds of over six thousand feet per minute. It can be noted that minimum weight per foot of length and per horsepower transmitted is an increasingly important requirement for drive chains in view of the industrial trend toward continually higher speeds. The parasitic load on the chain imposed by centrifugal force and other cumulative destructive effects attributable to specific weight at the higher speeds, seriously limits chain performance.

It follows that a primary object of this invention is to provide an improved detachable chain of high specific strength, capable of substantially higher speed and power transmission than those of the prior art. It also is an object to provide such a chain cheaper and simpler to manufacture; a chain adapted for quiet, efficient operation on standardized roller chain drive sprockets while retaining the basic simplicity of construction, separability and ease of installation motivating the detachable chain invention of the prior art. These and other objects and advantages of this invention will be further apparent following reference to the remaining specification and drawing in which like numerals designate like parts throughout, and in which FIG. 1 is a plan view of a length of the detachable chain embodying the present invention.

Figure 2:
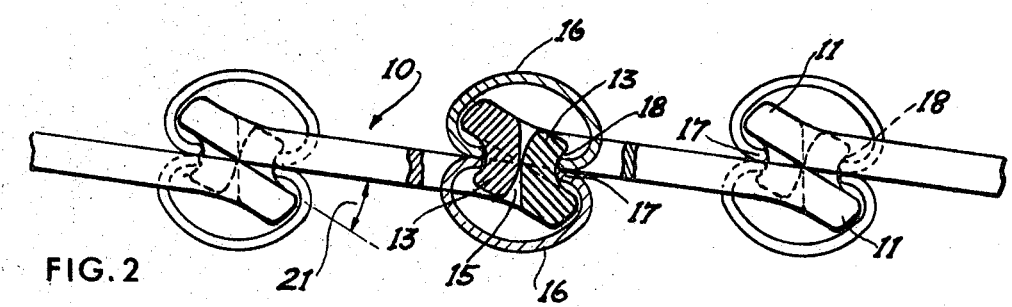
Figure 3:
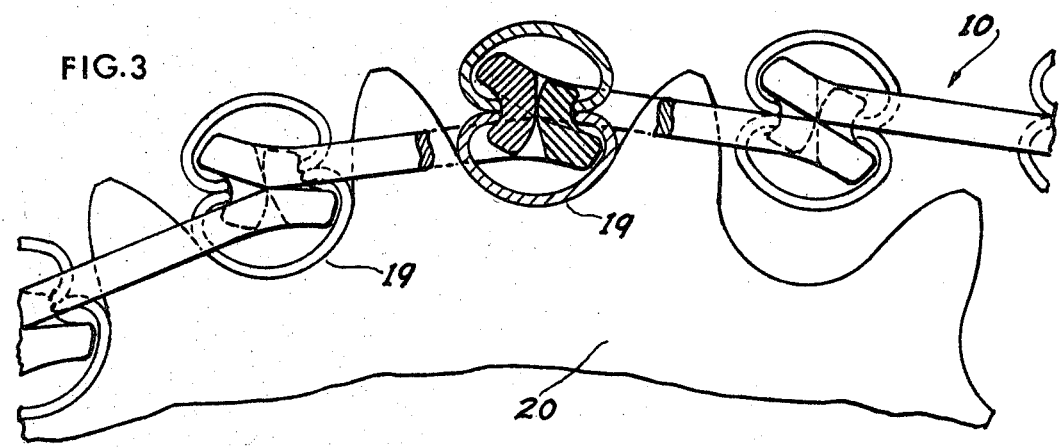

FIG. 2 is a partly sectioned side elevational view of the chain shown in FIG. 1, and FIG. 3 is a partly sectioned side elevational view showing the chain engaging a roller chain drive sprocket of industrially standardized tooth form.

Referring to the drawing, FIGS. 1–3 illustrate the assembled chain comprising interconnected, substantially flat, apertured link members 10, preferably having controlling dimensions adapting the chain for operation on single and multiple-width industrially standardized roller chain drive sprockets. The links are assembled end to end with overlapping end portions 11 bent out of the plane of the side portions 12 and having edge portions 13 at each end of the aperture projecting out of the general plane of the link structure. These projections intersect the aperture 14 of adjacent link members and are in rolling bearing contact with each other, thus constituting the link articulation centers 15.

The link members thus assembled are detachably secured in resiliently restrained alignment by opposed pairs of semicircular spring members 16 having a combined effective diameter equal to the roller diameter of an equivalent pitch standard roller chain. As shown, the spring members are shaped and arranged to bridge the overlapped link ends and seat with their end portions 17 in resiliently sprung contact with each other and with the back recesses 18 of the projecting link edge portions 13. With this arrangement the link members are free to articulate in relatively frictionless rolling contact with each other and with the ends of the spring members. The latter, it may be noted, impart a useful degree of spring resistance to the link rotation when engaging drive sprockets, which serves to cushion engagement contact with the sprocket teeth.

Manufacture of the link members of this chain may utilize any one of several well-known processes such as pattern or investment casting, forging, sintered powder metal, etc., depending on the strength desired, the highest attainable strength and bearing properties naturally ensuring optimum performance. Construction of the spring members likewise will utilize hardened and tempered spring steel or equivalent material.

In operation this chain further improves on the chain constructions of the prior art in eliminating the usual high-friction grinding action of the link ends against the sprocket teeth during engagement. In the present case, as shown in FIG. 3, the bearing interconnection of the links is entirely self-contained and enclosed and the spring members provide a large area of resilient contact 19 with the teeth of the drive sprocket 20. The practical requirement for convenient detachability is met by the provision of retaining spring members which can readily be sprung out of their seating in the recesses 18 of the projecting link portions 13. The chain of this invention also duplicates the mechanically versatile roller chain symmetry in its ability to operate on drive sprockets in either direction of rotation and in so-called serpentine drives requiring reverse curvature engagement. It will be noted that the minimum practicable sprocket tooth number for this chain is determined by the specific clearance angle 21 at which the bent end portions of the links subtend the overlapped flat portions, and by the usual overall performance requirements, well known to those in the art, affecting durable chain operation in a given drive.

It will be understood that this invention admits of changes in the construction and arrangement of the parts which will be obvious to those skilled in the art and which are within the scope of the appended claims.

What is claimed is:

1. A detachable chain comprising apertured links of flat sheet material assembled end to end with overlapping end portions bent out of the flat plane thereof, each of said links having portions of the material at each end of an aperture projecting out of said plane and intersecting an aperture of an adjacent link, said projecting portions being in rolling bearing contact with like portions of overlapped links, said links being detachably secured in said overlapped arrangement by arcuately formed flat sheet spring members bridging the overlapped link portions and having end portions in resiliently sprung seating retention on said projecting portions of the links, said spring members being further shaped and arranged to engage the teeth of drive sprockets.

2. The detachable chain of claim 1, each of said link members comprising side bar portions of said material on each side of an aperture and portions extending normal thereto bent out of the plane of said side bar portions at opposite ends of the aperture.

3. The detachable chain of claim 2, each of said portions extending normal thereto being bent out of the flat plane at opposite angles to each other.

4. The detachable chain of claim 1, each of said projecting and intersecting link portions being bent out of the flat plane of opposite angles to each other.

5. The detachable chain of claim 1, in which each of said spring members comprises end portions thereof engaging projecting end portions of adjacent links.

6. The detachable chain of claim 1, each of said spring members comprising an end portion thereof intersecting a link aperture and engaging an intersecting portion of an adjacent link and an end portion engaging a projecting end portion of an intersected link.

7. The detachable chain of claim 1, said arcuate spring members being constructed and arranged in diametrical opposition to each other to comprise a structure of substantially semicircular form projecting on each side of the overlapped link portions, said structure being equivalent in form and function to the roller members of industrially standardized roller chain.

8. The detachable chain of claim 1, said link members and said spring members being constructed and arranged with aperture proportions and engagement contours adapting them for operation on industrially standardized roller chain drive sprockets.

9. The detachable chain of claim 1, said link members being detachably secured in said overlapped arrangement by a plurality of arcuately formed flat sheet spring members.

References Cited
UNITED STATES PATENTS

| | | | |
|---|---|---|---|
| 214,735 | 4/1879 | Wheeler | 74—249 |
| 228,063 | 5/1880 | Greenwood | 74—249 |
| 2,530,014 | 11/1950 | Holmes | 74—249 |
| 2,551,578 | 5/1951 | Bendall | 74—229 |
| 2,770,143 | 11/1956 | Bendall | 74—245 |
| 2,770,144 | 11/1956 | Bendall | 74—245 |
| 2,836,984 | 6/1958 | Bendall | 74—249 |
| 3,027,774 | 4/1962 | Bendall | 74—249 |

JAMES A. WONG, Primary Examiner

U.S. Cl. X.R.
74—229, 252